April 1, 1952      L. JUY      2,590,975
CHANGE-SPEED GEAR FOR CYCLES AND THE LIKE
Filed Dec. 9, 1949
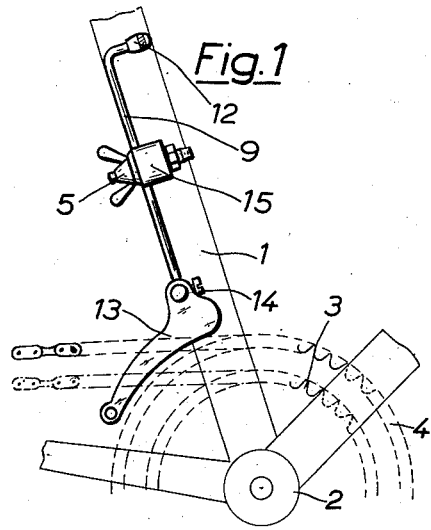
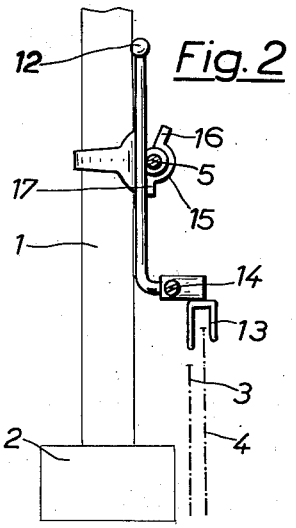
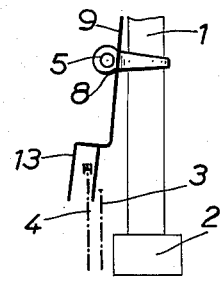
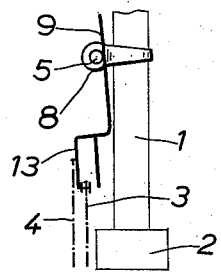
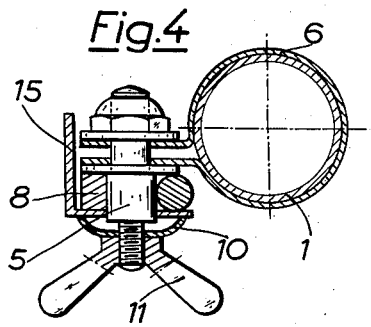
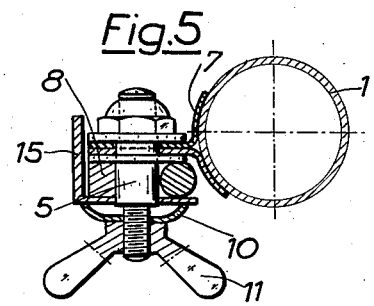
Lucien Juy
*INVENTOR.*
BY *J. Delattre-Seguy*
Attorney

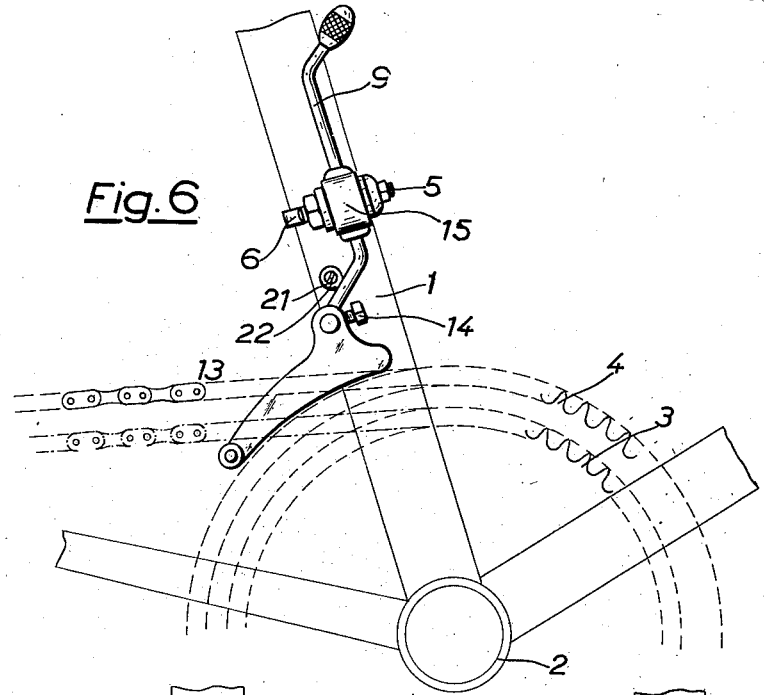
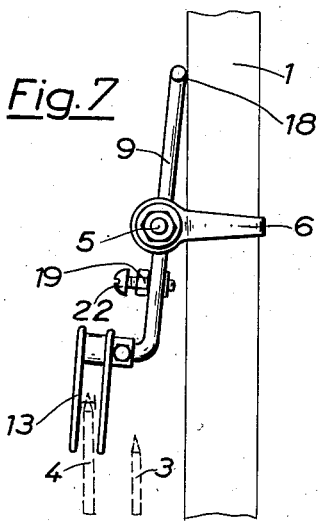
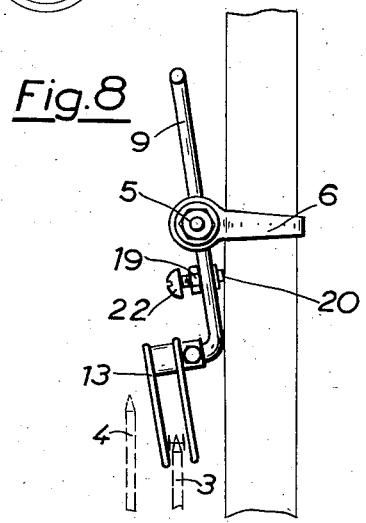

Patented Apr. 1, 1952

2,590,975

UNITED STATES PATENT OFFICE 2,590,975

CHANGE-SPEED GEAR FOR CYCLES
AND THE LIKE

Lucien Juy, Dijon, France

Application December 9, 1949, Serial No. 132,037
In France December 14, 1948

11 Claims. (Cl. 74—242)

Change speed gears used more particularly in association with the pedal gear on bicycles and the like include up to this day either reciprocating systems the machining and adjusting of which are comparatively intricate or else securing means requiring multiple collars or the application of welding operations of a comparatively high accuracy.

My invention has for its object to remove the drawbacks of such change speed gears operating through the derailing of the chain in front of the pedal gear; my improved change speed gear is adapted to be rapidly secured to the bicycle frame and to allow also a lateral shifting under conditions of easy mounting and reliable operation.

According to a further object of my invention, the change speed gear is controlled by a lever carrying at a point of its length a member rocking round a pivot secured to a predetermined point of the bicycle frame, the simultaneous rocking of said member and of the control lever being associated with a friction braking means including an elastic washer and means for adjusting the friction provided thereby, while the control lever carries a control knob at one end and the change derailing fork at the other end, so that said fork may shift the chain over either of two coupled plates forming part of the pedal gear and having different diameters.

According to a further object of my invention, the amplitude of the pivoting movement of the control lever is defined by stops.

I have illustrated in appended drawings by way of example and by no means in a binding sense a number of embodiments of my improved change speed gear. In said drawings:

Fig. 1 is a side elevational view of a change speed gear operating through derailment of the chain in front of the pedal gear. The dot and dash lines illustrate the two coupled plates and the locations of the chain when engaging same.

Fig. 2 is a side view corresponding to Fig. 1.

Fig. 3 is a diagrammatic side view illustrating the shifting of the change speed gear fork between its positions engaging either pedal gear plates.

Fig. 4 is a plan partly sectional view of the means pivotally securing the change speed gear through a collar engaging the frame 2.

Fig. 5 is a similar plan partly sectional view of a modification in the means for pivotally securing the change speed gear through a support rigid with the frame tube.

Fig. 6 is an elevational side view of a change speed gear associated with an adjusting stop.

Fig. 7 is a side view corresponding to Fig. 6 showing the fork of the change speed gear when registering with the larger plate of the pedal gear.

Fig. 8 is a side view corresponding to Fig. 6 of the change speed fork when located in register with the smaller plate of the pedal gear.

Turning to the drawings, it is apparent that the change speed gear according to my invention includes a pivot 5 secured to a suitable point of the tube 1 forming part of the frame as apparent from inspection of Fig. 1 that illustrates also the pedal gear casing 2 with the coupled plates 3 and 4.

As illustrated in Figs. 4 and 5, the pivot 5 may be secured either through a collar-shaped support 6 fitted over the tube (Fig. 4) or through a support 7 welded or brazed to the tube (Fig. 5).

Obviously it is possible to provide for any securing means such for instance as a direct welding of the pivot 5 to the tube 1.

To the pivot 5 is rockably secured a member 8 rigid with a pivoting lever 9 which is secured thereto through a point of its length.

An elastic braking system is provided that is constituted as shown in Figs. 4 and 5 by a convex washer 10 of any known or suitable design such as a Belleville or Grower washer of the simple or double convolution type or by a spring of any known type.

A winged nut 11 is screwed over the threaded end of the pivot 5 in order to provide for a friction of adjustable value through the agency of said spring or washer 10 that is compressed to the desired value between said nut and the rocking member 8 so that the latter is urged against its support.

The pivoting lever 9 is provided at its outer end with a control handle 12 while its opposite end carries the derailing means.

In the embodiment disclosed hereinabove the derailing means are constituted by a fork 13 that may be adjusted laterally through an adjustable shifting of the bent end of the lever 9 that is then locked in position by a screw 14 (Figs. 1 and 2).

Obviously the arrangement may be designed in a manner such that the fork is in one with the lever 9 or else it may be provided with any other suitable adjusting means for its lateral adjustment or even the lever 9 may be provided with any shaped auxiliary member or with any system adapted to shift the chain form one pinion or plate to the other.

Fig. 3 illustrates two positions that may be assumed by lever 9 according as to whether the arrangement is shifted into alignment with either of the plates 3 and 4 on the pedal gear.

The useful stroke of the lever 9, in other words the amplitude of its rocking may be defined by a stationary stop or it may be adjusted by a screw defining its angular position. By way of example and by no means in a binding sense, I have illustrated a stop in Fig. 2 as constituted by a cap or casing 15 with outwardly visible stops 16 and 17.

As apparent from inspection of Figs. 6, 7 and 8, the pivoting lever 9 abuts directly at 18 against the tube of the frame or against any other stationary point. The adjustment consists when the lever is in its abutting position in setting the fork into register with the plate 4 (Fig. 7). After a pivoting movement of the lever 9 to enter it into the position illustrated in Fig. 8, the fork 13 is set in alignment with the plate 3 through screwing or unscrewing of the stop 22 that is provided with a counternut 19 and abuts against a stationary point of the tube 1 as shown at 20 for instance.

The stationary points 18 and 20 being located invariably, it is apparent that a pushing of the pivoting control lever in either direction will return the fork 13 into the desired alignment with the corresponding plate 3 or 4.

Furthermore, if this arrangement is associated with plates the spacing between which is greater, it is sufficient to turn the screw 22 in the desired direction in order to adjust the amplitude of displacement allowed for the fork 13.

In Fig. 6 is shown a boss 21 rigid with the lever 9 and carrying the screw 22 controlling the angular amplitude of movement of the lever 9. The opposite arrangement is also possible according to which a stationary abutment is provided for cooperation with the tube at 20 while an adjustable stop is provided for cooperation with the upper point 18 on said tube. The result is exactly the same in both cases.

What I claim is:

1. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock round said pivot in a vertical plane parallel to the axes of the discs, a lever rigid with said member and adapted to rock therewith round the pivot through hand actuation of its upper end, means carried by the lower end of the lever for positively engaging the chain and shifting it from one of its disc engaging positions to the other, and means associated with the pivot for frictionally engaging the rocking member.

2. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock round said pivot in a vertical plane parallel to the axes of the discs, a lever rigid with said member and adapted to rock therewith round the pivot through hand actuation of its upper end, means carried by the lower end of the lever for positively engaging the chain and shifting it from one of its disc engaging positions to the other, and means associated with the pivot for frictionally engaging the rocking member, and stops for limiting the pivotal movement of the lever in either direction.

3. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock around said pivot in a vertical plane, a lever rigid with said member and adapted to rock therewith round the pivot through hand actuation of its upper end, means carried by the lower end of the lever for engaging the chain and shifting it from one of its disc engaging positions to the other, a friction washer fitted over the pivot for cooperation with the rocking member and means for adjusting the movement braking pressure exerted by said washer on the pivoting member.

4. A change speed gear for bicycles and the like vehicles incorporating a tubular frame comprising a pedal gear including two coaxial discs of different diameters, a chain adapted to be shifted from one disc to the other, a collar fitted over the frame above the pedal gear, a pivot rigid with said collar and having its axis substantially perpendicular to the plane of the frame, a member adapted to rock round said pivot in a vertical plane parallel to the axes of the discs, a lever rigid with said member and adapted to rock therewith round the pivot through hand actuation of its upper end, means carried by the lower end of the lever for positively engaging the chain and shifting it from one of its disc engaging positions to the other, and means associated with the pivot for frictionally engaging the rocking member.

5. A change speed gear for bicycles and the like vehicles incorporating a tubular frame comprising a pedal gear including two coaxial discs of different diameters, a chain adapted to be shifted from one disc to the other, a member rigidly and permanently secured to the frame above the pedal gear, a pivot rigidly and removably secured to the last mentioned member and extending in a direction substantially perpendicular to the plane of the frame, a member adapted to rock round said pivot in a vertical plane parallel to the axes of the discs, a lever rigid with said member and adapted to rock therewith round the pivot through hand actuation of its upper end, means carried by the lower end of the lever for positively engaging the chain and shifting it from one of its disc engaging positions to the other, and means associated with the pivot for frictionally engaging the rocking member.

6. A change speed gear for bicycles and the like vehicles incorporating a tubular frame comprising a pedal gear including two coaxial discs of different diameters, a chain adapted to be shifted from one disc to the other, a support rigid with the frame, a pivot carried thereby and extending perpendicularly to the plane of the frame, a threaded extension on the pivot, a friction washer fitted over said extension, a winged nut threadedly engaging said threaded extension and adapted to adjustably press the washer against the pivoting member and thereby urge the latter against the pivot support, a member adapted to rock round said pivot in a vertical plane, a lever rigid with said member and adapted to rock therewith round the pivot through hand actuation of its upper end, means carried by the lower end of the lever for engaging the chain and shifting it from one of its disc engaging positions to the other, and means associated with the pivot for frictionally engaging the rocking member.

7. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock round said pivot in a vertical plane, a lever rigid with said member and adapted to rock therewith round the pivot in a plane parallel to the axes of the discs through hand actuation of its upper end, a derailing fork rigid with the lower end of the lever for engaging positively the chain and shifting it from one of its disc-engaging positions to the other, and means associated with the pivot for frictionally engaging the rocking member.

8. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock round said pivot in a vertical plane, a lever rigid with said member and adapted to rock therewith round the pivot through hand actuation of its upper end, in a plane parallel to the axes of the discs, a chain derailing fork pivotally secured to the lower end of the lever, said fork being adapted to engage positively the chain and to shift it from one of its disc-engaging positions to the other, and means for adjusting the angular position of the fork with reference to the lever in a plane parallel to the frame, and means associated with the pivot for frictionally engaging the rocking member.

9. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock round said pivot in a vertical plane, a lever rigid with said member and adapted to rock therewith round the pivot through hand actuation of its upper end, means carried by the lower end of the lever for engaging the chain and shifting it from one of its disc engaging positions to the other, and means associated with the pivot for frictionally engaging the rocking member and a strap-shaped member fitted over the pivot and including two radial projections adapted to form stops for the angular movement of the lever in corresponding directions.

10. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock round said pivot in a vertical plane, a lever rigid with said member and adapted to rock therewith round the pivot through hand actuation of its upper end, the lever abutting in one direction of its pivotal movement against a point of the frame, an adjustable stop carried by the other end of the lever and adapted to engage the frame at another point of said frame for limiting the angular movement of the lever in the other direction, means carried by the lower end of the lever for engaging the chain and shifting it from one of its disc engaging positions to the other and means associated with the pivot for frictionally engaging the rocking member.

11. A change speed gear for bicycles and the like vehicles incorporating a tubular frame comprising a pedal gear including two coaxial discs of different diameters, a chain adapted to be shifted from one disc to the other, a pivot rigid with the frame above the pedal gear, a member adapted to rock round said pivot in a vertical plane, a lever rigid with said member and adapted to rock therewith round the pivot through hand actuation of its upper end, means carried by the lower end of the lever for engaging the chain and shifting it from one of its disc engaging positions to the other, the lever abutting against the frame through its upper end for the position corresponding to the engagement of the chain with the outermost disc, a tapped boss at the lower end of the lever, a screw threadedly and adjustably engaging said boss, a counternut associated with said screw, said screw abutting against a cooperating point of the frame for the position of the lever corresponding to engagement of the chain with the innermost disc and means for braking the movement of the lever and rocking member.

LUCIEN JUY.

REFERENCES CITED

The following references are of record in the file of this patent:

FOREIGN PATENTS

| Number | Country | Date |
|---|---|---|
| 45,457 | France | May 27, 1935 |
| | (1st addition to 774,378) | |
| 470,737 | Great Britain | Aug. 20, 1937 |